April 9, 1968
K. H. MEYER
3,377,540
OVERLOAD PROTECTION CIRCUIT FOR SOLID STATE POWER SUPPLIES
Filed Aug. 13, 1965
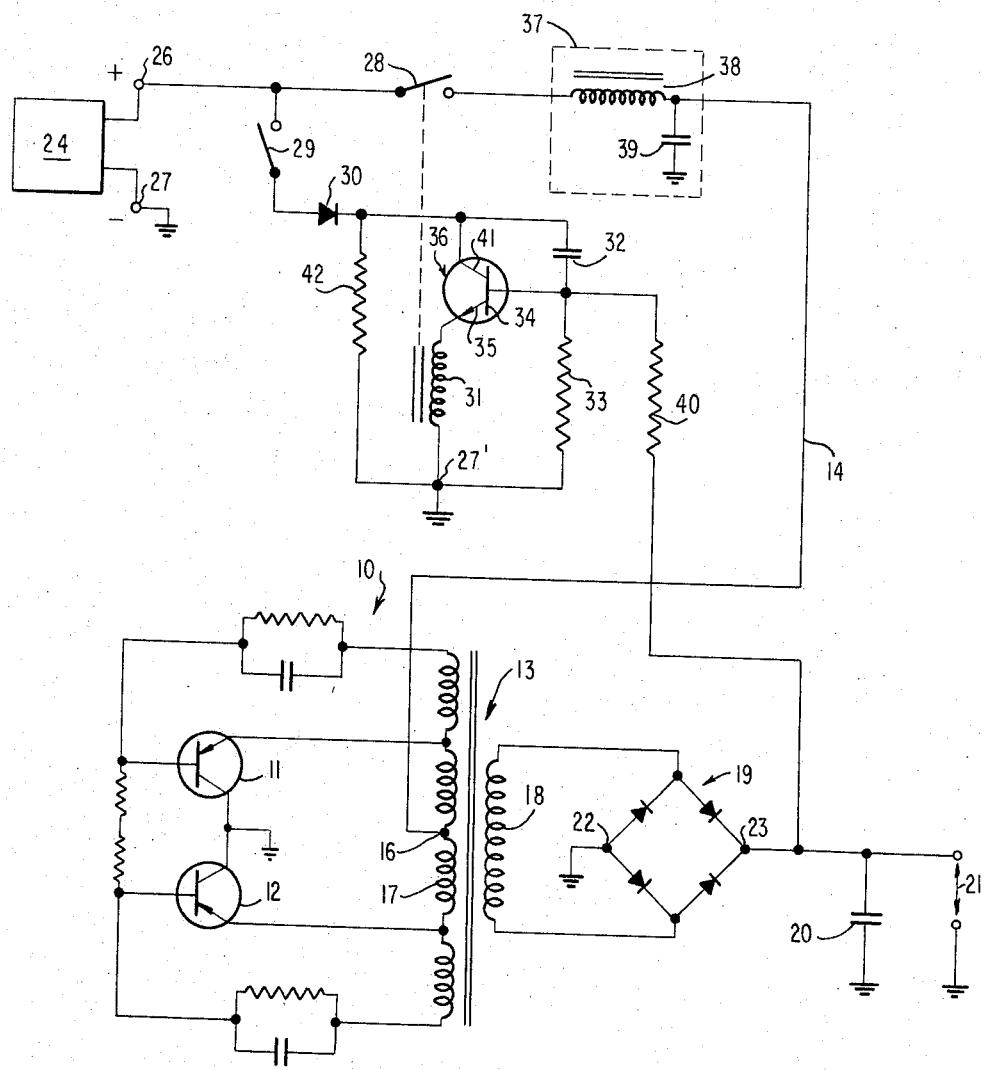
INVENTOR
KARL H. MEYER
BY Browne, Schuyler & Beveridge
ATTORNEYS

United States Patent Office 3,377,540
Patented Apr. 9, 1968

3,377,540
OVERLOAD PROTECTION CIRCUIT FOR SOLID STATE POWER SUPPLIES
Karl H. Meyer, Kinnelon, N.J., assignor to Aircraft Radio Corporation, Boonton, N.J., a corporation of New Jersey
Filed Aug. 13, 1965, Ser. No. 479,407
3 Claims. (Cl. 321—11)

ABSTRACT OF THE DISCLOSURE

An overload protection circuit in which charging current to a capacitor is utilized to cause a transistor to conduct and energize a relay to close contacts connecting the source to a direct current power supply. A portion of the direct current voltage supplied to a load from the power supply is applied to the transistor to maintain its conduction and hence maintain energization of the relay and supply voltage to the power supply. A switch controlling the charging of the capacitor through a reverse current diode must be opened to allow the capacitor to discharge through a resistor and then reclosed in order to restart the circuit.

---

This invention relates to overload protection circuits for solid state power supplies generally of the type wherein transistors are connected in an oscillator circuit and particularly concerns an overload protection circuit for the solid state devices utilizing an electromechanical relay.

The invention is primarily directed to transistorized inverter circuits generally of the type disclosed in Kurtz Patent 3,020,491, and is an improvement on certain aspects of the protection circuits shown in Noyes Patent 3,161,834, and the references cited against said Noyes patent. Specifically, the invention contemplates reduction in the number of components required to afford adequate overload and reverse polarity protection for such inverter circuits.

It is, accordingly, an object of the invention to provide an improved overload and reverse polarity protection circuit for solid state inverters which requires few component parts, which is economical, and in which, due to the reduction in the number of component parts, the reliability thereof is enhanced.

In accordance with the invention, a relay is first momentarily energized by a resistance-capacitance (R-C) timing circuit to close normally open contacts and supply operating potential to the inverter unit and, then, depending on the amplitude of oscillations in the inverter circuit, is maintained energized by application of a portion of the output potential of the inverter to the protection circuit. On overload, the portion of output potential applied to the protection circuit falls to a value insufficient to maintain energization of the relay which then disconnects the inverter from the source of operating potential by opening the contacts in the supply line to the inverter. If an overload exists during starting, the output potential is insufficient to maintain energization of the relay following its momentary energization by the R-C timing circuit to disconnect the inverter from the source of operating potential. A resistor in shunt with the R-C timing circuit quickly discharges the capacitor to allow rapid restarting of the circuit. The relay is required to be energized during normal operation and can only be energized by application of operating potential of proper polarity to the input terminals of the circuit. A diode blocks application of reverse polarity current to the circuit so that improper connection of the inverter to the power source is prevented by non-energization of the relay.

With reference now to the drawings, a solid state inverter 10 comprising a pair of transistors 11 and 12 connected in a regenerative feedback circuit with a saturable core reactor 13 is supplied with unidirectional current from conductor 14 connected to center tap 16 of the main or primary windings 17 of the reactor. On application of operating potential to the oscillator 10, the oscillator begins to oscillate and as oscillations build up, a potential is generated in secondary or output winding 18 which is rectified by a bridge rectifier 19 and filtered by capacitor 20 and a direct current potential appears at output terminals 21. A more detailed description of the operation of inverter 10 may be found in Kurtz Patent 3,020,491. However, it is to be understood that the disclosed inverter circuit is merely exemplary of the many types of inverter currents to which the invention is applicable.

In the absence of an overload protection circuit, an overload or short across the output terminals 21 results in a reduction in the amplitude of oscillations in the oscillator circuit 10 which appears as a decrease in the magnitude of the direct current potential appearing at the output terminals 22 and 23 of bridge rectifier 19. Such an overload, even existing for only a short period of time, can result in the destruction of transistors 11 and 12 through the mechanism of thermal runaway, as described in the aforementioned Noyes Patent 3,161,834.

The overload and reverse current protection circuit of the invention includes capacitor 32 conected in series with resistor 33, reverse current limiting diode 30 and switch 29. One side of switch 29 is connected to the positive input terminal 26 and an end of resistor 33 is connected to the negative or ground 27'. The juncture or intermediate point between capacitor 32 and resistor 33 is connected to base 34 of transistor 36 and collector 41 is connected to the upper end of capacitor 32. Emitter 35 is connected through relay coil 31 to ground 27'. Resistor 42 has one end connected to the upper side of capacitor 32, while the other end thereof is connected to ground 27'. Normally, open relay contacts 28 connect positive terminal 26 to inverter 10 through surge protection circuit 37 and conductor 14. A portion of the output potential of inverter 10 is fed back to the protection circuit through a voltage divider comprising resistors 40 and 33.

In accordance with the present invention, overload protection is achieved by control of relay coil 31 having its operating contacts 28 in series circuit with the source of unidirectional potential on conductor 14. Normally, open contacts 28 block application of potential to the inverter 10. Switch 29 is connected to the positive terminal 26 of the source of unidirectional current 24 and supplies power through reverse current blocking diode 30 to energize relay 31. Initially, the current applied to the circuit on closing switch 29 charges timing capacitor 32 through timing resistor 33. This charging current develops a potential at base 34 which causes transistor 36 to conduct and energize relay coil 31 and close contacts 28 and supply power to inverter 10. Surge protection circuit 37, comprising reactor 38 and capacitor 39 blocks transient surges from being applied to the inverter. As the inverter circuit begins to oscillate, its output potential builds up rapidly to full potential (assuming that there is no overload on the output terminal 21). A portion of the output voltage appearing at terminals 23 of bridge circuit 19 is applied through the voltage divider comprising resistor 40 and resistor 33 to base 34 to keep transistor 36 conducting after capacitor 32 is charged. It should be noted that capacitor 32 is maintained charged during normal operation of the circuit after it has obtained its initial charge. Thus, initially, the momentary charging current for capacitor 32 is utilized to energize relay 31 to close contacts 28 and supply operating potential to inverter 10. As capacitor 32 begins to obtain its full charge, the charging current drops to a negligible value and, if oscillation in the inverter 10 have not built up to its normal value, the potential applied through voltage dividing resistors 40 and 33 will be insufficient to maintain conduction of transistor 36 allowing the relay to de-energize and open contact 28 to remove operating potential from inverter 10. Should the output potential from inverter 10 which appears at the bridge terminals 22 and 23 be of sufficient value (normal), then the potential applied by voltage divider resistors 40 and 33 to the base 34 of transistor 36 will be sufficient to maintain conduction of transistor 36 and energization of relay 31 to keep contact 28 closed.

Whenever there is an overload on output terminals 21, the amplitude of oscillations in inverter 10 decreases resulting in a decrease in the direct current potential appearing at bridge output terminals 22 and 23 and a reduction in the potential applied through voltage dividing resistors 40 and 33. Consequently, this voltage is insufficient to maintain conduction of transistor 36 and contacts 28 open to disconnect inverter 10 from source 24.

Thus, during starting and normal operation of inverter 10, relay 31 is energized first by the momentary charging current for capacitor 32 and then by a normal output potential appearing at the output terminals 22 and 23 of bridge rectifier 19. If, for any reason, the output voltage appearing at rectifier terminals 22 and 23 falls below a predetermined value, as would result from an excessive overload or a short on the inverter, the potential applied to the base 34 of transistor 36 through voltage dividing resistors 40 and 33 will be insufficient to maintain conduction of transistor 36 and relay 31 in the emitter circuit of transistor 36 de-energizes to open contacts 28 and remove operating potential from the inverter.

In order to restart the circuit, switch 29 must be opened and reclosed. During this interval of opening of switch 29, resistor 42 and resistor 33 form a quick discharge path for timing capacitor 32 so that on reclosing of switch 29, charging current will again flow to capacitor 32 to again momentarily energize relay 31 and close contacts 28. If the overload persists, output potential applied to voltage divider resistors 40 and 33 will still be insufficient to maintain conduction of transistor 36 and energization of relay 31 so that contacts 28 will open to remove operating potential from the inverter 10.

There are only two active elements (transistor 36 and relay 31) required in the overload protection circuit of the invention thus increasing the reliability thereof and, at the same time substantially reducing the cost of such protection circuits. In addition, the invention may be applied to existing inverter circuits without serious modifications thereof. An important feature of the invention is in the use of reverse current limiting diode 30. If the input terminals 26 and 27 of the protection circuit are reversed and reverse potential is applied to terminal 26, reverse current diode 30 prevents charging current from being delivered to capacitor 32 so that relay 31 will not be energized and contacts 28 remain open. Thus, only when proper polarity of operating potential is applied to terminals 26 and 27 will contacts 28 be closed.

It will be apparent that the invention may be applied to both positive and negative power supplies with due regard being had to the polarity of diode 30, transistor 36, and the inverter transistors 11 and 12.

While a preferred embodiment of the invention has been described, the invention may be incorporated in other types of circuits and other modifications will be apparent so that the foregoing description is intended as illustrative and should not be construed in a limiting sense.

What is claimed is:

1. An overload protection circuit for solid state inverters supplied from a source of unidirectional current comprising a series connected resistor and capacitor, switch means for connecting said series resistor and capacitor across said source of unidirectional current, a relay having normally open contacts directly in circuit between said source and said inverter and an operating coil therefor, means for energizing said coil on charging current flowing to said capacitor to close said normally open contacts and apply said source to said inverter, a feedback circuit from the output of said inverter to said means for energizing said relay coil for maintaining energization of said relay when the inverter is not overloaded, said means for energizing said relay coil including, a transistor, means connecting the emitter-collector electrode circuit of said transistor in parallel with said series connected resistor and capacitor, and means connecting a point intermediate said resistor and capacitor to the base electrode of said transistor, and the feedback potential from said inverter being applied to said base electrode, and resistor means connected in parallel with the emitter collector circuit of said transistor and said series connected resistor and capacitor for rapidly discharging said capacitor on operation of said switch means to disconnect said series resistor and said capacitor from said source.

2. An overload protection circuit as defined in claim 1 including a reverse current blocking diode in series circuit with said series resistor and capacitor.

3. A protection circuit for solid state inverters supplied from a source of unidirectional current comprising a capacitor and a resistor connected in series, switch means for connecting said series connected capacitor across said source of unidirectional current, a transistor having emitter-collector and base electrodes, a relay having a coil and at least one set of normally open contacts operated by said coil, means connecting said normally open relay contacts in series circuit between said source and said inverter to supply operating potential to said inverter when operated closed by said coil, means connecting said coil in the emitter-collector circuit of said transistor so that when said transistor conducts said coil is energized, means connecting the base of said transistor to a point intermediate said capacitor and resistor so that the momentary charging current to said capacitor on operation of said switch means causes said transistor to conduct and energize said coil and close said contacts to apply said source to said inverter, means for applying a direct current potential proportional to the output potential of said inverter to the base electrode of said transistor to maintain conduction of said transistor and energization of said coil in the absence of an overload condition on said inverter, resistor means connected in shunt with said capacitor and resistor circuit for providing a quick discharge path for said capacitor on opening of said switch means to disconnect said capacitor and resistor from said source, and a diode in series circuit between said switch means and said capacitor and resistor for preventing energization of said relay coil and closing of said normally open contacts unless the proper polarity of said source is connected to said switch means and said inverter circuit.

References Cited

UNITED STATES PATENTS 3,161,834  12/1964  Noyes _____ 321—11 X
3,243,658  3/1966  Blackburn _____ 317—31

JOHN F. COUCH, *Primary Examiner.*

W. H. BEHA, *Assistant Examiner.*